Feb. 18, 1941.　　　　J. LYMAN　　　　2,231,929
TRIDIMENSIONAL RADIO DIRECTION INDICATOR
Filed April 29, 1937　　　2 Sheets-Sheet 1
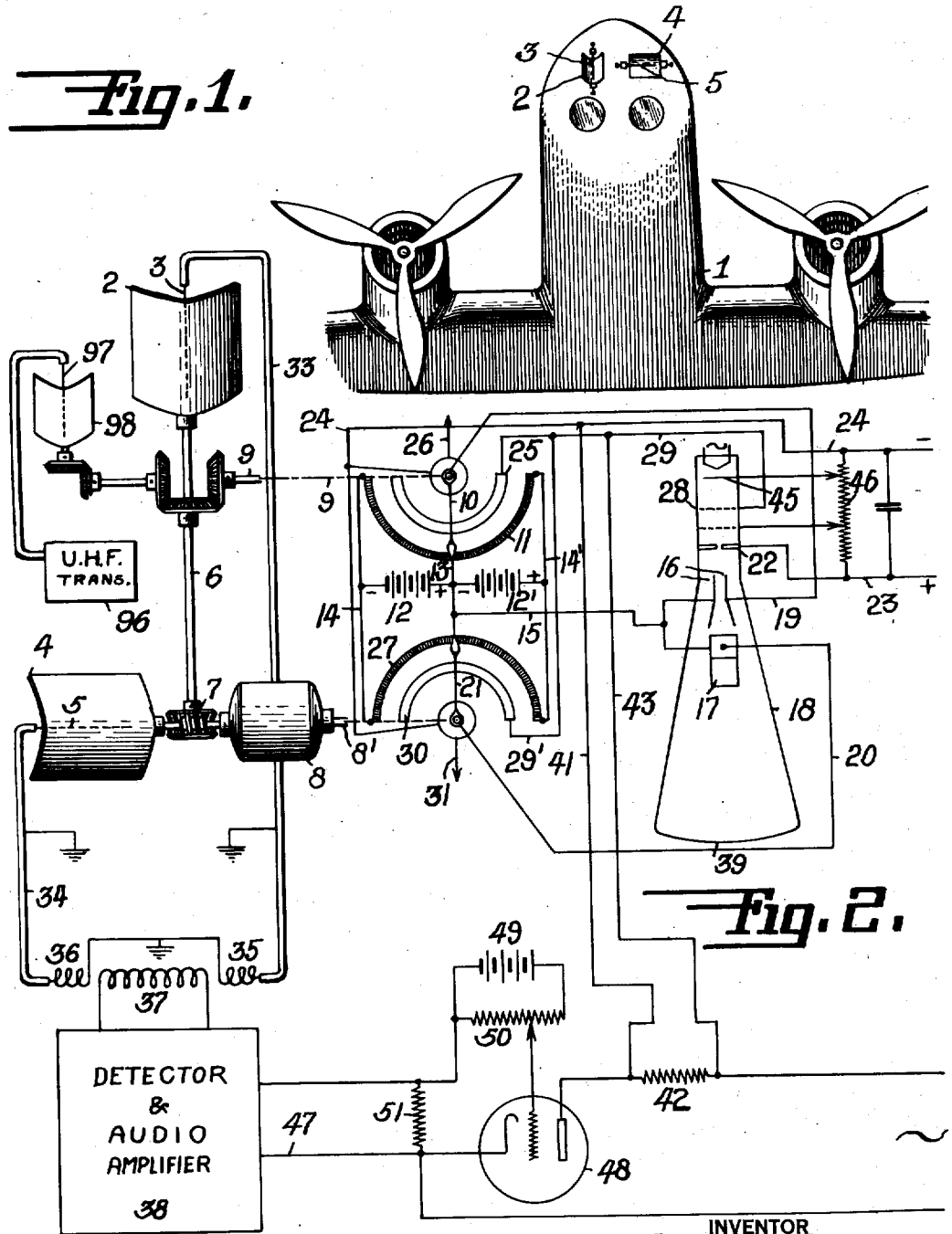
INVENTOR
Joseph Lyman
BY
Herbert H. Thompson
HIS ATTORNEY.

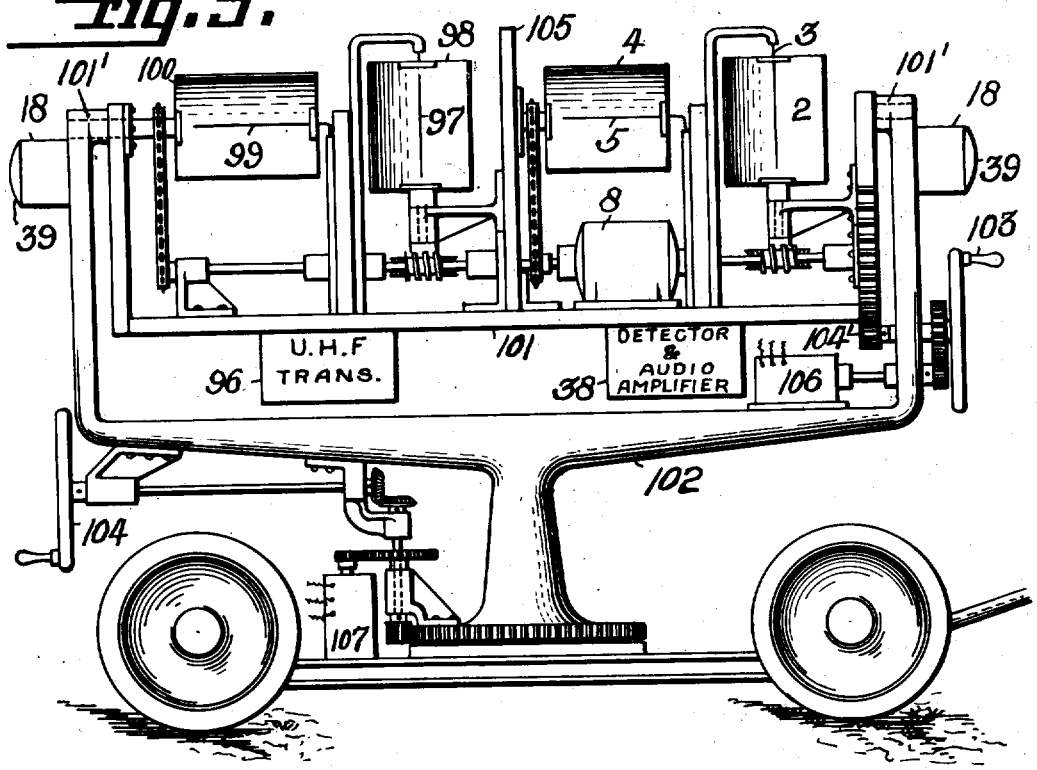
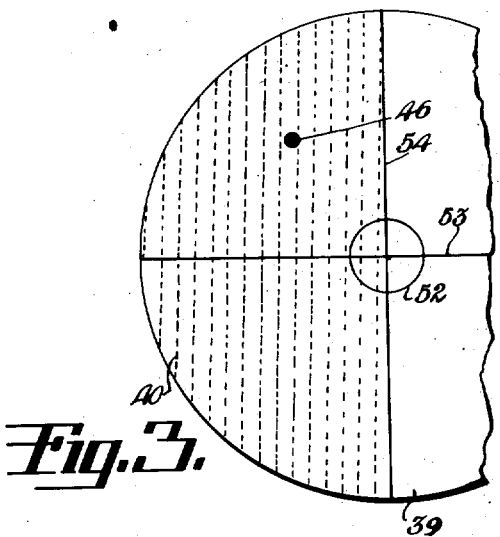
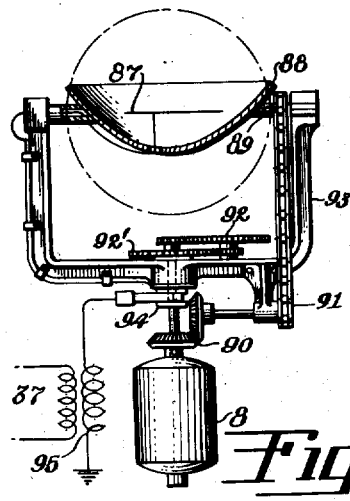

Patented Feb. 18, 1941

2,231,929

UNITED STATES PATENT OFFICE 2,231,929

TRIDIMENSIONAL RADIO DIRECTION INDICATOR

Joseph Lyman, Huntington, N. Y., assignor to Sperry Gyroscope Company, Inc., Brooklyn, N. Y., a corporation of New York Application April 29, 1937, Serial No. 139,640

9 Claims. (Cl. 250—11)

This invention relates, generally, to the three dimensional location of objects by radio means, and the invention has reference, more particularly, to a novel tridimensional radio direction indicator adapted for various uses. Thus, the novel indicator is adapted for use on aircraft either for indicating the direction of approach of other aircraft, to thereby prevent collision under conditions of poor or zero visibility, or for use on the ground as when locating aircraft for purposes of gunfire control, or for controlling aircraft landings from the ground, and for other purposes.

In the above recited uses of the novel device of this invention, it is necessary that the same indicate the bearing of the desired object, such as an approaching airplane, both in azimuth and elevation. The mere warning of the presence of another aircraft in the vicinity is insufficient information for the prevention of collision between approaching aircraft, since there would be no indication as to the change of course necessary to avoid collision.

The principal object of the present invention is to provide a novel tridimensional radio direction indicator that employs directional antennae for scanning the territory to be viewed, the output of said antennae being detected and amplified and employed for tripping thermionic rectifier means, the output of which is used to control a cathode ray tube, the deflecting plates of which are synchronously energized with the operation of said antennae, whereby a spot is caused to appear on the screen of said cathode ray tube in position corresponding to the position of an object, such as an airplane, in the territory being viewed.

Another object of the present invention lies in the provision of a novel device of the above character wherein, in one form of the invention, horizontal and vertical directional antennae are rotated at a constant speed differential, the common means used for rotating said antennae being also used for controlling the application of voltages to the deflecting plates of a cathode ray tube so that, were this tube operating, the electron beam thereof would be made to traverse or scan the screen of the tube in synchronism with the scanning of the territory to be viewed by the antennae, the output of said antennae being combined and then detected and amplified for application to the grid of a grid controlled rectifier connected for turning on the cathode ray beam when both antennae are aimed at the transmitter of the object to be viewed, i. e., when the sum of the voltages from both antennae is a maximum, the cathode ray serving to produce a spot on the screen of the tube in correspondence with the position of the object in space, the said tube also serving to simultaneously indicate any other objects present by additional spots.

Still another object of the present invention is to provide a novel direction indicator of the above character wherein, in another form of the invention, horizontal and vertical fixed directional antennae are employed, the outputs of which are commutated and applied in sequence to detector amplifier means, the output of which is used for feeding thermionic rectifier means used for controlling the operation of a cathode ray tube having potentials applied to its deflecting plates in synchronism with the commutation of said antennae, whereby a spot appears on the screen of the tube in correspondence with the position of the object viewed.

Other objects and advantages will become apparent from the specification, taken in connection with the accompanying drawings, wherein the invention is embodied in concrete form.

In the drawings,

Fig. 1 is a fragmentary view showing an aircraft equipped with one form of the novel direction indicator device of this invention.

Fig. 2 is a wiring diagram of this form of the invention.

Fig. 3 is a view in front elevation, partly broken away, of the face of the cathode ray tube used.

Fig. 4 is a view in elevation and partly in section, of the single antenna employed for scanning both in azimuth and elevation.

Fig. 5 is a view, in elevation, of the system of this invention employed in a radio locator for use in gunfire control.

Similar characters of reference are used in all of the above figures to indicate corresponding parts.

Referring now to Figs. 1 and 3, the reference numeral 1 designates an airplane equipped with an azimuth scanning directional antenna consisting of a reflector 2 of parabolic cross-section having an antenna conductor 3 positioned at its focus, the reflector 2 being arranged to be rotated about a vertical axis. The craft 1 is also equipped with an elevation scanning directional antenna consisting of a reflector 4 of parabolic cross-section having an antenna conductor 5 positioned at its focus, the reflector 4 being adapted for rotation about a horizontal axis.

As especially illustrated in Fig. 2, the reflector 2 is shown carried by a vertical shaft 6 that is driven through worm and wheel reduction gearing 7 from a motor 8, while the reflector 4 is shown driven directly from the motor 8. A shaft 9 is driven from shaft 6 and rotates a resistor contact arm 10, cooperating with a semicircular potentiometer resistor 11, at the same speed as reflector 2. Batteries 12 and 12' have unlike terminals connected together and to a center-tap of resistor 11 by lead 13, while the remaining terminals of these batteries are connected by leads 14 and 14' to the terminals of resistor 11. Lead 13 is connected by lead 15 to one of the horizontal deflecting plates 16 and to one of the vertical deflecting plates 17 of the cathode ray tube 18. The remaining horizontal deflecting plate is connected by lead 19 to the resistor arm 10, while the remaining vertical deflecting plate is connected by a lead 20 to a resistor arm 21 driven from the shaft 8' of motor 8 at the same speed as that of vertical scanning reflector 4.

The anode 22 of tube 18 is supplied from the positive side 23 of a D. C. source, while the negative side 24 of this source is connected through lead 41, resistor 42, leads 43 and 29 to the control grid 28 of tube 18, thereby normally biasing this tube to off condition. The cathode 45 is connected through a portion of resistance 46 to the negative side 24 of the source. The negative lead 24 is also connected to a contact arm 26, also driven by the shaft 9, the contact arm 26 engaging a semicircular conducting segment 25 for that half of each revolution of shaft 9 during which the resistor contact arm 10 is out of engagement with the resistor 11. Segment 25 is connected by lead 29 to the control grid 28. The resistor arm 21 is similar to arm 10 and cooperates with a semicircular potentiometer resistor 27 having its mid-tap connected to lead 13 and its ends connected to leads 14 and 14'.

The control grid 28 of cathode ray tube 18 is also connected by leads 29 and 29' to a semicircular conducting segment 30 arranged concentrically with the resistor 27, which conducting segment is arranged to be engaged by a contact arm 31 that is fixed on though insulated from motor shaft 8' so as to rotate with this shaft, the arm 31 engaging segment 30 for that half of each revolution of arm 21 during which this latter arm is out of engagement with resistor 27. The negative lead 24 is also connected to arm 31.

The horizontal scanning antenna 3 and the vertical scanning antenna 5 are connected through shielded antenna leads 33 and 34 to coils 35 and 36, respectively, which are arranged in inductive relation to the input coil 37 of a detector and audio amplifier 38. The rotating antenna reflectors 2 and 4 have the effect of impressing amplitude modulations upon the unmodulated carrier wave received from the transmitter of the object which is being viewed or which is reflected from such object. Preferably, the carrier wave is of ultra high frequency, not only because the same can be generated and received by simple means, but these waves easily penetrate fog, are not appreciably interfered with by uncontrollable natural phenomena such as radiation from the sun, and can be detected directionally with comparative ease. U. H. F. waves of approximately 600 mc./sec. are entirely satisfactory.

In use, as will further appear, it is necessary for the slower rotating antenna reflector, illustrated as reflector 2 in the drawings, to rotate fast enough so as to prevent flicker on the screen 39 of the cathode ray tube 18. In practice, it has been found that to prevent flicker, the reflector 2 should rotate at a speed of 750 R. P. M. or over, and as the differential speed between reflector 2 and reflector 4 will determine the number of scanning lines provided on the face 39 of tube 18, it is essential that the reflector 4 travel at a considerably faster speed than reflector 2. Experience has shown that a 30 line system having 12½ pictures per second is satisfactory in use, which means that the reflector 4 must travel 30 times as fast as the reflector 2, or, in other words, if the reflector 2 rotates at 12½ R. P. S. or 750 R. P. M., then the vertical scanning antenna 4 should rotate at 375 R. P. S. or 22,500 R. P. M.

In scanning the face 39 of tube 18, it will be noted that when contact arm 10 is at the left hand end of resistor 11, this arm receives the maximum negative potential provided by batteries 12 and 12' and applies this potential to the right hand horizontal deflecting plate of the tube 18, as shown in Fig. 2, thereby causing the cathode ray beam (should the tube be operating) to move to the left hand end of its travel on face or screen 39 of tube 18. The reflector 2 is so arranged angularly with respect to contact arm 10 that when this contact arm is engaging the left hand end of resistor 11, i. e., when arm 10 points to the left side of the sheet, then the reflector 2 will also point to the left side of the sheet for receiving rays from that direction, and as this reflector 2 sweeps forwardly, the arm 10 sweeps downwardly, and when the reflector 2 points directly ahead, as shown in Fig. 2, the arm 10 points directly downwardly, as shown in this figure, and when reflector 2 turns so as to face the right hand side of the sheet, the arm 10 will also point in this direction, so that this arm 10 is in contact with resistor 11 for that half of the revolution of reflector 2 while this reflector is scanning 180° measured from port forwardly through 180° to starboard of the craft upon which the same is mounted. As this reflector 2 moves through this 180° forward scanning arc from left to right, the arm 10 also moves from left to right, causing the cathode ray beam (if the same were on) to move transversely across the face 39 of the tube 18. Actually, this beam is only on when both reflectors 2 and 4 are directed at the object being scanned, i. e., when the outputs of the directional antennae 3 and 5 are at their maximum, as will further appear. It will be noted that with the arm 10 in the position shown in Figs. 1 and 2, both horizontal deflecting plates 16 are connected to lead 13, so that the imaginary cathode ray beam is at the center of the face 39. When arm 10 reaches the right hand end of resistor 11, the right hand horizontal plate 16 is connected to lead 14', thereby causing the imaginary cathode ray beam to be positioned at the right hand end of its travel.

While this cathode ray beam is traveling transversely across screen 39, it is also being made to scan this face vertically by the action of resistor 27 and contact arm 21. This will be apparent when it is noted that arm 21 makes 30 revolutions to one revolution of arm 10, so that the cathode ray beam (imagining the same to be on) makes 30 vertical passages across screen 39 while making one transverse passage thereacross, producing the scanning effect as shown in Fig. 3 by the dotted lines 40. Actually, these lines do not appear in the face of the screen, because the tube is biased to off position, as previously pointed out, by having its control grid connected to negative lead 24.

The output of the detector-amplifier 38 is applied through leads 47 to the input of a grid controlled rectifier 48. A C-battery 49 and potentiometer 50 are employed for adjusting the bias on the grid of tube 48, to thereby determine at will the magnitude of the output of the detector-amplifier necessary to effect the discharge of tube 48. Tube 48 has its plate-cathode circuit supplied preferably with high frequency voltage, i. e., voltage of preferably at least 1000 cycles, so that this tube shuts off immediately the output of the detector-amplifier has fallen below its maximum, i. e., below that obtaining when both antennae are aimed at the transmitter of the aircraft being viewed. The bias on tube 48 determined by potentiometer 50 and grid resistor 51 is such that tube 48 only discharges at the time of maximum voltage output of the detector-amplifier.

The discharge of tube 48 produces a voltage drop across the resistor 42 in the plate circuit of this tube, thereby raising the potential on the grid 28 of cathode ray tube 18 and causing the tube to operate so that a spot appears on the screen 39 corresponding in position to the object being viewed. Thus, if the indicator apparatus of this invention is mounted on an airplane, it will scan through a forward hemisphere whose axis coincides with the line of flight and the screen 39 will give diagrammatically and in miniature the bearings of the approaching aircraft in azimuth and elevation. It will be noted that when tube 48 passes current, the right hand end of resistor 42, connected by leads 43 and 29 to the control grid of tube 18, becomes positive with respect to its left hand end that is connected by lead 41 to the negative side 24 of the source, so that the control grid potential is raised, starting the cathode ray beam of tube 18, which beam is properly deflected by the potentials on deflecting plates 16 and 17 to provide a spot 46 at the proper location on screen 39.

It will be noted that when contact arms 10 and 21 are out of engagement with their respective resistors 11 and 27, corresponding to movements of reflectors 2 and 4 through the rear halves of their revolutions, the contact arms 26 and 31 are in engagement with their cooperating contact segments 25 and 30, thereby short circuiting the resistor 42 and preventing the tube 18 from operating while the antennae 3 and 5 are scanning the rear half of their circular arcs.

It will be noted that any number of objects within the 180° solid angle scanned by the antennae will be indicated in their proper positions by spots on the screen 39. Displacement of a spot on this screen to the left or right, up or down, gives diagrammatically and in miniature the position of the object, such as an aircraft, viewed relative to the nose of the observing aircraft.

When the device is used on an aircraft for preventing collision with other aircraft, a circle 52 (see Fig. 3) is preferably provided at the center of the screen 39 to indicate that if a spot of light is within this circle, danger of collision is imminent. Horizontal and vertical guide lines 53 and 54 are also preferably provided on screen 39 to provide reference lines and to divide the screen into quadrants. Collision is to be expected when the spot of light remains within the circle and gets larger, or when the spot 46 remains still in any position on the screen while getting larger.

So long as the slower reflector 2 rotates at 750 R. P. M. or higher, persistence of vision will prevent flicker on the screen 39, or by using suitable fluorescent material having a time delay in the decay of its luminosity on screen 39, lower rates of rotation are feasible without flicker. Also, the speed of the directional antennae may be cut in half by using loops or bi-directional antennae instead of parabolic reflectors.

When using the device of the present invention for gunfire control, as when locating aircraft from the ground, a suitable U. H. F. transmitter is provided on the ground and the reflected rays from the viewed object employed for operating the indicator of this invention.

Obviously, if it is desired to scan more or less than 180° in the form of the invention shown in Figs. 1 and 2, the angular extent of the potentiometers 11 and 27 will be varied accordingly.

Also, a single antenna mounted universally may be used for scanning the desired field of view instead of the two antennae shown in the forms of the invention heretofore described. Thus, in Fig. 4, an ultra high frequency antenna 87 is mounted within a parabolic reflector 88 that is carried by a horizontal shaft 89 driven from motor 8 through gearing 90 and sprocket chain 91. Thus, the motor 8 is adapted to rotate the reflector 88 about a horizontal axis so as to scan in elevation at the same rate of sped as that of the reflector 4 of Figs. 1 and 2. Similarly, the reflector 88 is rotated about a vertical axis by means of motor 8 operating, through reduction gearing 92, to turn gear 92' and attached yoke 93 carrying the ends of shaft 89. Thus, the yoke 93 is revolved at a definite speed ratio with respect to the speed of reflector 88 about its horizontal axis, the speed ratio being, for example, 30:1, as in the previous forms of the invention, the turning of the yoke 93 about a vertical axis providing the azimuth scanning of the antenna. The output of antenna 87 is connected through the slip ring and brush combination 94 to the coil 95, inductively related to coil 37 connected to the detector and audio amplifier 38, as in Figs. 1 and 2 of the drawings. The potentiometers (not shown) will be operated off the motor 8, similarly to those, i. e., 11 and 27, shown in Figs. 1 and 2.

When using the device of the present invention for gunfire control, it is preferable that the U. H. F. transmitter move with the receiving antenna so that the maximum reflected signal shall be received. Thus, in Figs. 1 and 2, the U. H. F. transmitter 96 supplies an antenna 97 whose rotating reflector 98 is driven at the same speed as the reflector 2 and is arranged in the same phase position as the reflector 2 at all times. Similarly, the vertically scanning reflector (not shown) of the transmitter 96 would be operated from shaft 8', so that these transmitting antennae act to direct the transmitted waves in directions corresponding to the directions of reception of the receiving antennae.

In Fig. 5, a typical radio locator arrangement for gunfire control apparatus is shown. Parts of this equipment which are similar to those in Figs. 1 and 2 are correspondingly numbered. In this figure, the vertical scanning transmitting antenna 99, having the rotating reflector 100, is also shown. It will be noted that all of the antenna reflectors are driven from the motor 8, the horizontal reflectors 4 and 100 rotating, for example, 30 times as fast as the vertical antennae. This equipment is mounted on a platform 101 that has trunnions 101' journaled in bearings provided in a yoke 102. A handwheel 103 is connected through gearing 104' for turning the platform 101, and hence the transmitting and receiving equipment, in elevation. Similarly, the yoke 102 is adapted to be turned in azimuth by means of the handwheel 104, acting through the gearing shown. The cathode ray tubes 18 are provided at each end of the yoke 102 so as to be conveniently visible to the persons operating handwheels 103 and 104. The U. H. F. transmitter equipment 96, the detector and amplifier 38, and associated apparatus including the cathode ray tube control, are all mounted on the platform 101. Preferably, a suitable shield 105 is located between the transmitting and receiving equipment to prevent interference.

In order to take off the elevation and azimuth movements of the transmitting and receiving equipment for use in operating guns or gunfire control directors, transmitting "Selsyns" 106 and 107 are employed. The "Selsyn" 106 is operated from handwheel 103 for setting in the elevation indication for the gunfire control director, whereas the "Selsyn" 107 is operated from the handwheel 104 for setting in the azimuth indication for the gunfire control director.

In use, as soon as an object, such as an airplane, appears on the screen 39 of the cathode ray tube 18, the operators of handwheels 103 and 104 turn these wheels so as to bring the cathode ray spot on the screen 39 to the center of the screen, thereby indicating that the object is in the center of view of the cathode ray screen, the antenna equipments at that time pointing directly toward the object when at the center of their scanning ranges. The necessary movements of handwheels 103 and 104 for accomplishing this result provide the necessary information for the gunfire control directors to set the guns upon the target.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a tridimensional radio direction indicator, azimuth and elevation differentially rotating directional antennae, a cathode ray tube normally biased to inoperative condition, potential varying means rotatable in synchronism with said antennae for varying potentials on the deflecting plates of said tube, whereby, were said tube in operation, the beam thereof would scan the screen of said tube in synchronism with the scanning operation of said antennae, and thermionic tube means supplied from said antennae for reducing the bias on said cathode ray tube and effecting the operation of said cathode ray tube when both of said antennae are receiving the maximum signal from the object viewed, whereby the screen of said tube is caused to indicate the bearings of said object in azimuth and elevation.

2. In a tridimensional radio direction indicator, azimuth and elevation differentially rotating directional antennae, a cathode ray tube normally biased to inoperative condition, potential varying means rotatable in synchronism with said antennae for varying potentials on the deflecting plates of said tube, whereby, were said tube in operation, the beam thereof would scan the screen of said tube in synchronism with the scanning operation of said antennae, thermionic tube means supplied from said antennae for reducing the bias on said cathode ray tube and effecting the operation of said cathode ray tube when both of said antennae are receiving the maximum signal from the object viewed, whereby the screen of said tube is caused to indicate the bearings of said object in azimuth and elevation, and means associated with said potential varying means for limiting the scanning operation of said cathode ray tube to a 180° solid angle.

3. In a tridimensional radio direction indicator, azimuth and elevation differentially rotating directional antennae, a cathode ray tube normally biased to inoperative condition, potential varying means rotatable in synchronism with said antenna for varying potentials on the deflecting plates of said tube, whereby, were said tube in operation, the beam thereof would scan the screen of said tube in synchronism with the scanning operation of said antennae, a detector-amplifier supplied from said antennae, and a grid controlled rectifier in the output circuit of said detector-amplifier to be controlled by the latter, said rectifier being connected to start said cathode ray tube when both of said antennae are directed toward the object scanned and are receiving maximum signal therefrom, whereby a spot appears on the screen of said tube in synchronous position with that of the object scanned.

4. In an apparatus for locating objects, comprising directional transmitting antenna means and receiving antenna means, means for rotating said transmitting and receiving antenna means in synchronism for scanning a desired range, detector and amplifier means fed from said receiving antenna means, indicator means connected with said detector-amplifier means and adapted to indicate the location of an object scanned by said antenna means, and means for moving each said antenna means in accordance with the indications of said indicator so that each said antenna means is directed toward the object when at the center of its scanning range.

5. In an apparatus for locating objects, comprising directional transmitting antenna means and receiving antenna means, means for rotating said transmitting and receiving antenna means in synchronism for scanning a desired range, detector and amplifier means fed from said receiving antenna means, indicator means connected with said detector-amplifier means and adapted to indicate the location of an object scanned by said antenna means, manually operable means for moving said antenna means in accordance with the indications of said indicator so that said antenna means are directed toward the object when at the center of their scanning range, and means operating in response to movement of said manually operable means for controlling a gunfire control director.

6. A non-optical anti-aircraft fire control system, including radio directional transmitting and receiving antenna means rotatable about a horizontal axis, a second radio directional transmitting and receiving antenna means rotatable about a vertical axis, a main frame adjustable in azimuth and elevation upon which both of said antenna means are rotatably mounted, and means for orienting and elevating said frame from the signals received by said antenna means, to give the target bearings and angular elevation.

7. In apparatus for locating objects, continuously rotating antenna means for scanning a field of view both in azimuth and elevation, a cathode ray tube normally biased to inoperative condition, potential varying means rotatable in synchronism with said antenna means for varying potentials on the deflecting plates of said tube, whereby, were said tube in operation, the beam thereof would scan the screen of said tube in synchronism with the scanning operation of said antenna means, and thermionic tube means having a grid, filament and plate with its grid circuit controlled from said antenna means and having a high frequency alternating current directly applied to the plate of said tube, said tube means being connected to reduce the bias on said cathode ray tube and momentarily effect operation of said cathode ray tube in response to the reception of a maximum signal obtaining upon the directing of the antenna means directly at the object scanned, whereby the screen of said tube is caused to indicate by a spot thereon the bearings of said object in azimuth and elevation.

8. A tridimensional radio direction indicator as defined in claim 7, wherein orienting means is provided for moving said antenna means angularly in azimuth and elevation so that the spot on the screen of said tube remains on the center of said screen while tracking the object, and means for picking off the azimuthal and elevational movements of said orienting means.

9. In a tridimensional radio direction indicator, azimuth scanning rotating antenna means, elevation scanning rotating antenna means, said azimuth and elevation antenna means having a definite speed ratio therebetween, a cathode ray tube having a control grid and deflecting plates, potentiometer means operated in accordance with the speeds of rotation of said azimuth and elevation antenna means and connected to the deflecting plates of said cathode ray tube for applying beam deflecting potentials thereto in synchronism with the scanning operations of said antenna means, a detector-amplifier fed from said azimuth and elevation antenna means, a grid controlled rectifier having its input circuit fed from said detector-amplifier and having a resistor in its output circuit connected in the control grid circuit of said cathode ray tube, means for normally biasing said grid controlled rectifier off, and means for supplying the plate of said rectifier directly with high frequency alternating current for controlling the operation of said cathode ray tube, whereby the latter only passes current for the moment that both antenna means are simultaneously directed at an object to thereby indicate synchronously and in miniature objects viewed by said azimuth and elevation antenna means.

JOSEPH LYMAN.